United States Patent [19]

Hata

[11] Patent Number: 4,994,752

[45] Date of Patent: Feb. 19, 1991

[54] POSITION DETECTING POTENTIOMETER FOR A MOVING BODY

[75] Inventor: Daisuke Hata, Funabashi, Japan

[73] Assignee: Ricoh Company, Ltd., Tokyo, Japan

[21] Appl. No.: 356,373

[22] Filed: May 24, 1989

[30] Foreign Application Priority Data

May 25, 1988 [JP] Japan ................................. 63-125898

[51] Int. Cl.⁵ ........................ G01R 27/02; H01C 10/32
[52] U.S. Cl. ................................... 324/714; 324/704;
324/723; 338/171; 338/202
[58] Field of Search ...................... 324/704, 714, 723;
338/171, 202; 340/870.38; 354/400

[56] References Cited

U.S. PATENT DOCUMENTS

| 4,247,816 | 1/1981 | Harrer et al. | 324/714 |
| 4,568,876 | 2/1986 | Maisch | 324/714 |
| 4,706,062 | 11/1987 | Männle et al. | 338/171 X |

FOREIGN PATENT DOCUMENTS 58-202432 11/1983 Japan .

Primary Examiner—Reinhard J. Eisenzopf
Assistant Examiner—Jack B. Harvey
Attorney, Agent, or Firm—Oblon, Spivak, McClelland, Maier & Neustadt

[57] ABSTRACT

A position detecting apparatus electrically detects the present position of a moving body reciprocated within a movable region. The apparatus comprises a resistance section continuously disposed by a predetermined length along the reciprocating direction within a detecting region corresponding to the movable region on a substrate composed of an insulator. A plurality of region discriminating patterns are formed by combining a conductive section discontinuously disposed by a predetermined length along the reciprocating direction within the detecting region on the substrate, and an insulating section having no conductor. An electric brush is provided which is connected to the moving body and reciprocated within the detecting region in a state in which the brush slidably contacts the resistance section and the plurality of region discriminating pattern section. A first position detector detects the position of the moving body based on a resistance value corresponding to the position of the brush when the brush is located on the resistance section. A second position detector detects the position of the moving body by detecting a predetermined kind of combination of the conductive section and the insulating section when the brush is located on the region discriminating pattern sections; both the resistance section and the region discriminating pattern sections are disposed on the substrate. Another position detecting apparatus may be used by electrically detecting the present position of the moving body reciprocated within the movable region.

8 Claims, 14 Drawing Sheets

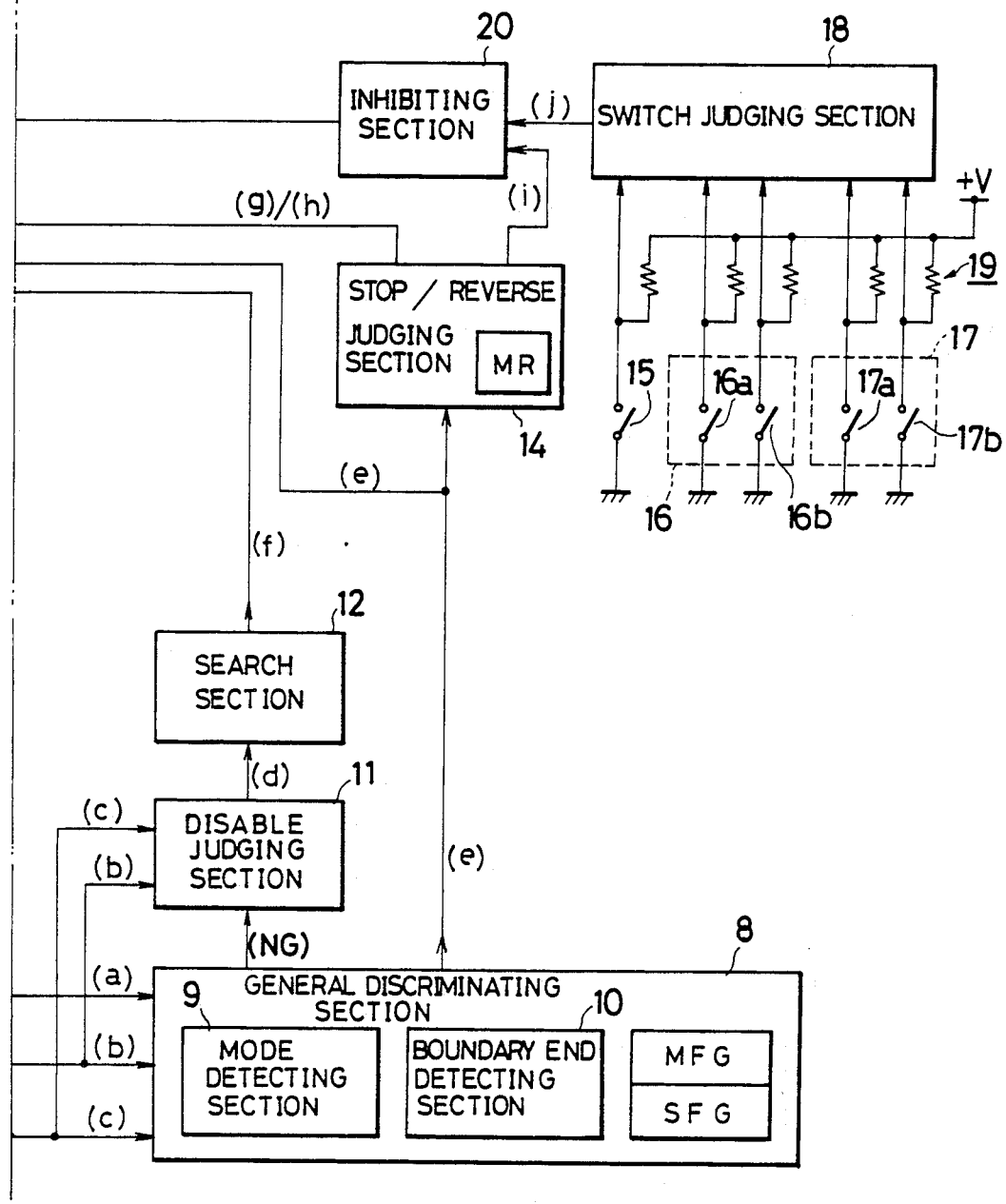

Fig. 4

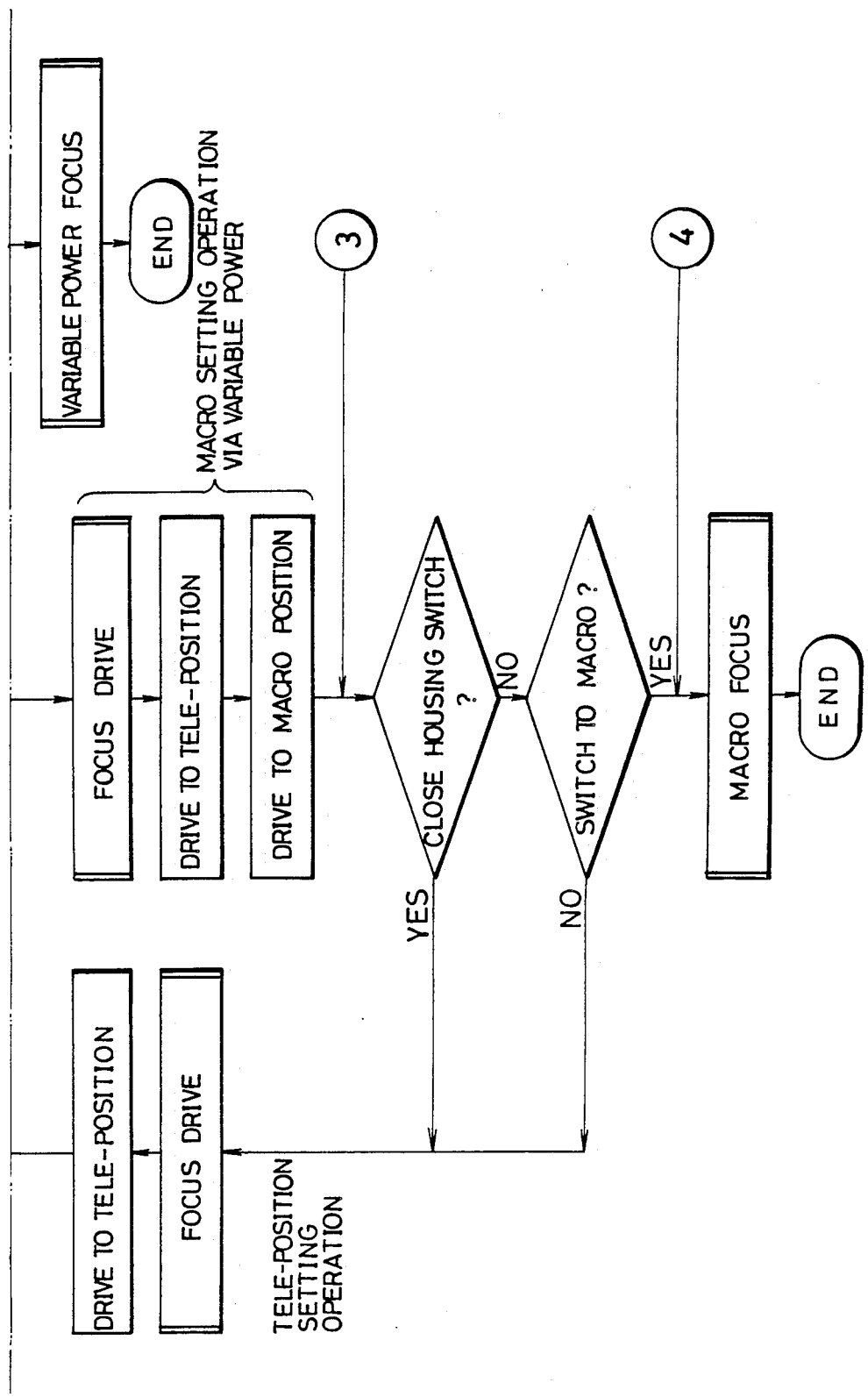

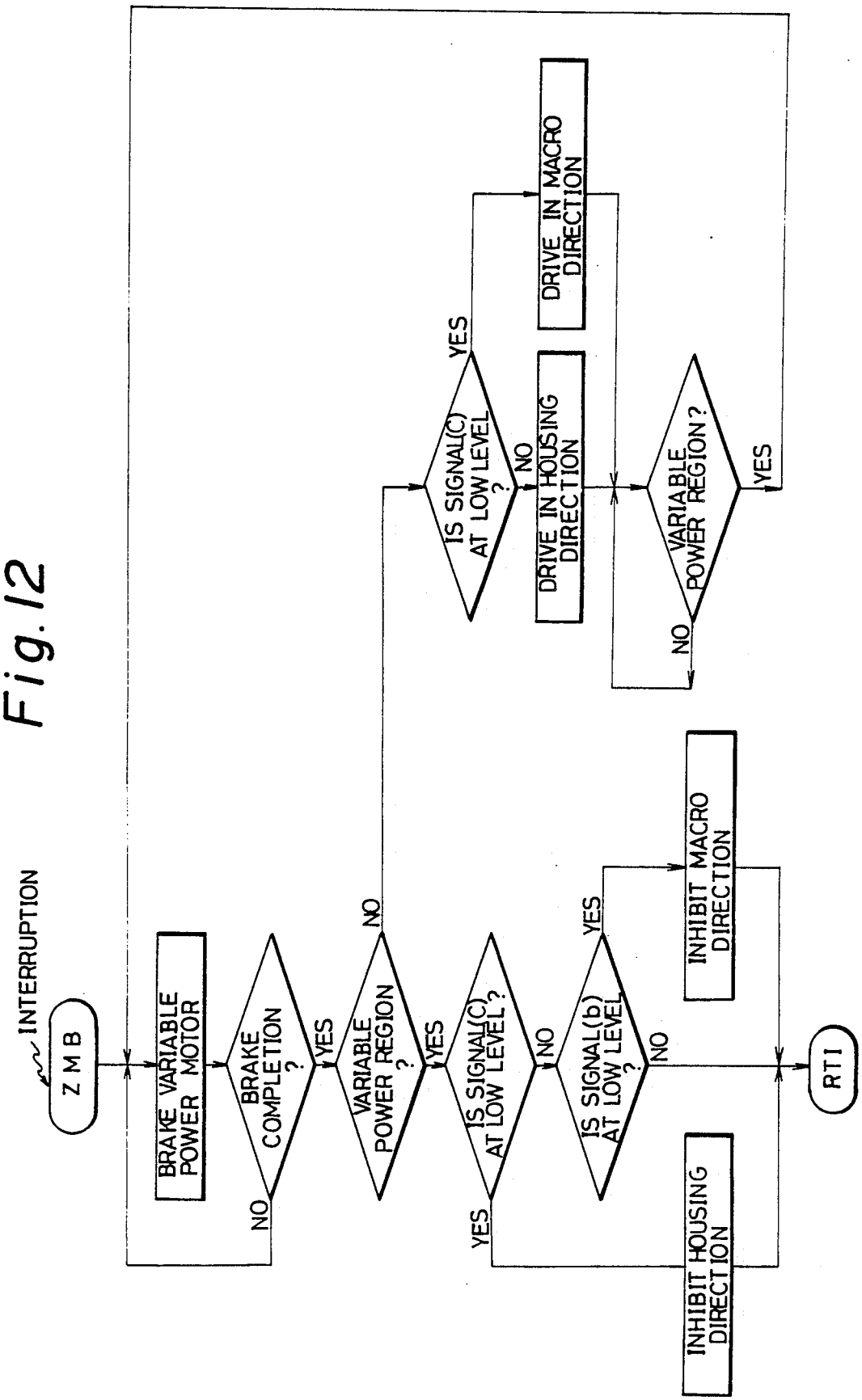

POSITION DETECTING POTENTIOMETER FOR A MOVING BODY

BACKGROUND OF THE INVENTION

The present invention relates to a position detecting apparatus for electrically detecting the present position of a moving body reciprocated within a movable region.

Recently, a camera body and a photographing lens used for the camera have been greatly electronized or electrically operated. For example, with respect to the photographing lens, a group of lenses constituting this photographing lens are driven by a motor, etc., and can be set by the operation of a switch into a plurality of regions such as a variable power region in which the focal distance can be changed, a macro region for enabling a macro photographing, a housing region in which the lenses can be housed when they are not used.

To reduce the cost of a one chip micro computer (which is simply called "CPU" in the following description), the applicant of this application has considered and tried various kinds of experiments for performing, by the CPU, a control for changing the focal distance in the above variable power region, for example with respect to the photographing lens, especially, a control for performing the shift correction of a varifocal lens in which a shift in position of a formed image is caused by the change in focal distance.

It is possible to dispose the above CPU within the photographing lens to independently perform the control operation thereof. However, it is preferable that the photographing lens is also controlled by the CPU of the camera body from an economical view point. Accordingly, an operating switch operated by a user of the camera, a state detecting switch for detecting states of various kinds of mechanism portions of the camera body and the photographing lens, etc., are connected to input ports for recognizing an external state required to execute various kinds of controls by the CPU.

The number of input ports depends on the kind of the CPU but is limited, and it is desirable that the number of switches connected to the input ports is as small as possible to correspond to the extension of various kinds of control operations and the change in specifications of the camera and the photographing lens.

With respect to the photographing lens having the plural regions mentioned above, it is necessary to dispose a means for recognizing by the CPU in which region the above group of lenses are located. Concretely, it is considered to dispose a means for attaching a resistor onto a substrate and moving an electrically sliding brush on the resistor through the movement of the above group of lenses, and detecting the positions of the group of lenses by the change in resistance value.

However, the change in focal distance must be continuously detected within the above zoom region. On the other hand, in the macro and housing regions mentioned above, it is sufficient for the group of lenses to simply stop in a predetermined position so that it is not necessary to continuously detect the positions of the group of lenses. Accordingly, when one resistor is used to discriminate the above-mentioned three regions, the changing range of the resistance value of the resistor used in the variable power region is narrowed by an amount thereof used in the macro and housing regions. Therefore, the accuracy in detection of the focal distance, i.e., the accuracy in detecting the positions of the group of lenses in the variable power region is reduced.

To solve this problem, it is considered that a dedicated resistor be used in the variable power region and, in the macro and housing regions independent of the variable power region, several region discriminating patterns in the shape of a stripe composed of a combination of conductive and insulating sections are disposed in the shape of a flat face and the above brush is moved on the region discriminating patterns through the movement of the group of lenses to discriminate these regions by the combination of the above conductive and insulating sections. However, in the case of such a construction, it is necessary to dispose two substrates composed of a substrate for attaching thereto the brush and the resistor for the variable power region, and a substrate for disposing the region discriminating patterns and the brush for the housing and macro regions. Therefore, the two substrates are independent of each other and drive systems for the brushes are also independent of each other so that the accuracies in position detection thereof are reduced and the number of constructional members is increased, thereby increasing the number of adjusting operations.

Since the above members must be housed in a space limited within the camera, the area for the above substrates is limited and a space for disposing a lead portion for electrically connecting the above resistor or conductive section in such a condition must be further disposed. Correspondingly, the resistor and the conductive section are small-sized and the contact areas between these members and the brushes become small so that the operation of the apparatus becomes unstable.

SUMMARY OF THE INVENTION

It is therefore an object of the present invention to provide a position detecting apparatus which is compact in construction, which is cheaply manufactured and in which the position of a moving body can be continuously detected and a constant position thereof can be detected with a high accuracy.

The above object of the present invention can be achieved by a position detecting apparatus for electrically detecting the present position of a moving body reciprocated within a movable region, the apparatus comprising a resistance section continuously disposed by a predetermined length along the reciprocating direction within a detecting region corresponding to the movable region on a substrate composed of an insulator; a plurality of region discriminating pattern sections formed by combining a conductive section discontinuously disposed by a predetermined length along the reciprocating direction within the detecting region on the substrate, and an insulating section having no conductor; an electric brush connected to the moving body and reciprocated within the detecting region in a state in which the brush slidably contacts the resistance section and the plurality of region discriminating pattern sections; a first position detector for detecting the position of the moving body based on a resistance value corresponding to the position of the brush when the brush is located on the resistance section; and a second position detector for detecting the position of the moving body by detecting a predetermined kind of combination of the conductive section and the insulating section when the brush is located on the region discriminating pattern sections; both the resistance section and the region discriminating pattern sections being disposed on the substrate.

In another embodiment of the present invention, the above object can be achieved by a position detecting apparatus for electrically detecting the present position of a moving body reciprocated within a movable region, the apparatus comprising a flat pattern section disposed by a predetermined length along the reciprocating direction of the moving body within a detecting region corresponding to the movable region on a substrate composed of an insulator; an electric brush connected to the moving body and reciprocated in the detecting region in a state in which the brush can slidably contact the flat pattern section; and a hole for electrically connecting the flat pattern section to a lead section disposed on a rear side of the flat pattern section in a predetermined position of the flat pattern section through which the brush does not pass; the lead section connected to the flat pattern section being constructed such that the position of the moving body is detected from a detecting output from the lead section when the brush slidably contacts the flat pattern section.

In the position detecting apparatus constructed above, the brush connected to the moving body slidably contacts the resistance section and the region discriminating pattern sections disposed on the same substrate. When this brush is located on the resistance section, the first position detector detects the continuous position of the moving body. When the brush is located on the region discriminating pattern sections, the second position detector detects the constant position of the moving body.

Further, in the position detecting apparatus constructed above, a through hole is disposed in the position of the flat pattern section through which the brush does not pass. The flat pattern section is electrically connected to the lead section disposed on the rear side thereof through this through hole. Accordingly, the brush slidably contacts the flat pattern section having a width wider than that of the brush, i.e., a large area. Therefore, the brush and the flat pattern section contact in a preferable state and act to provide the detecting output accurately corresponding to the moving body with respect to the lead section.

Further objects and advantages of the present invention will be apparent from the following description of the preferred embodiments of the present invention as illustrated in the accompanying drawings.

BRIEF DESCRIPTION OF THE DRAWINGS

FIG. 1, FIG. 1(i) and FIG. 1(ii) is a block diagram showing the entire construction of a position detecting apparatus in accordance with an embodiment of the present invention;

FIGS. 4 and 5 are respectively plan and bottom views showing a concrete construction of the discriminating pattern section shown in FIG. 1;

FIGS. 10, 11 and 12 are flow charts showing the operational sequence in the embodiment of FIG. 1 in which FIGS. 10(i), 10(ii) and 11(i), 11(ii) illustrate a main routine showing the entire operational sequence, and FIG. 12 illustrates a subroutine showing a stopping control (ZMB) by an interrupting processing.

DESCRIPTION OF THE PREFERRED EMBODIMENTS

The preferred embodiments of a position detecting apparatus of the present invention will now be described with reference to the accompanying drawings.

Figure 1I:
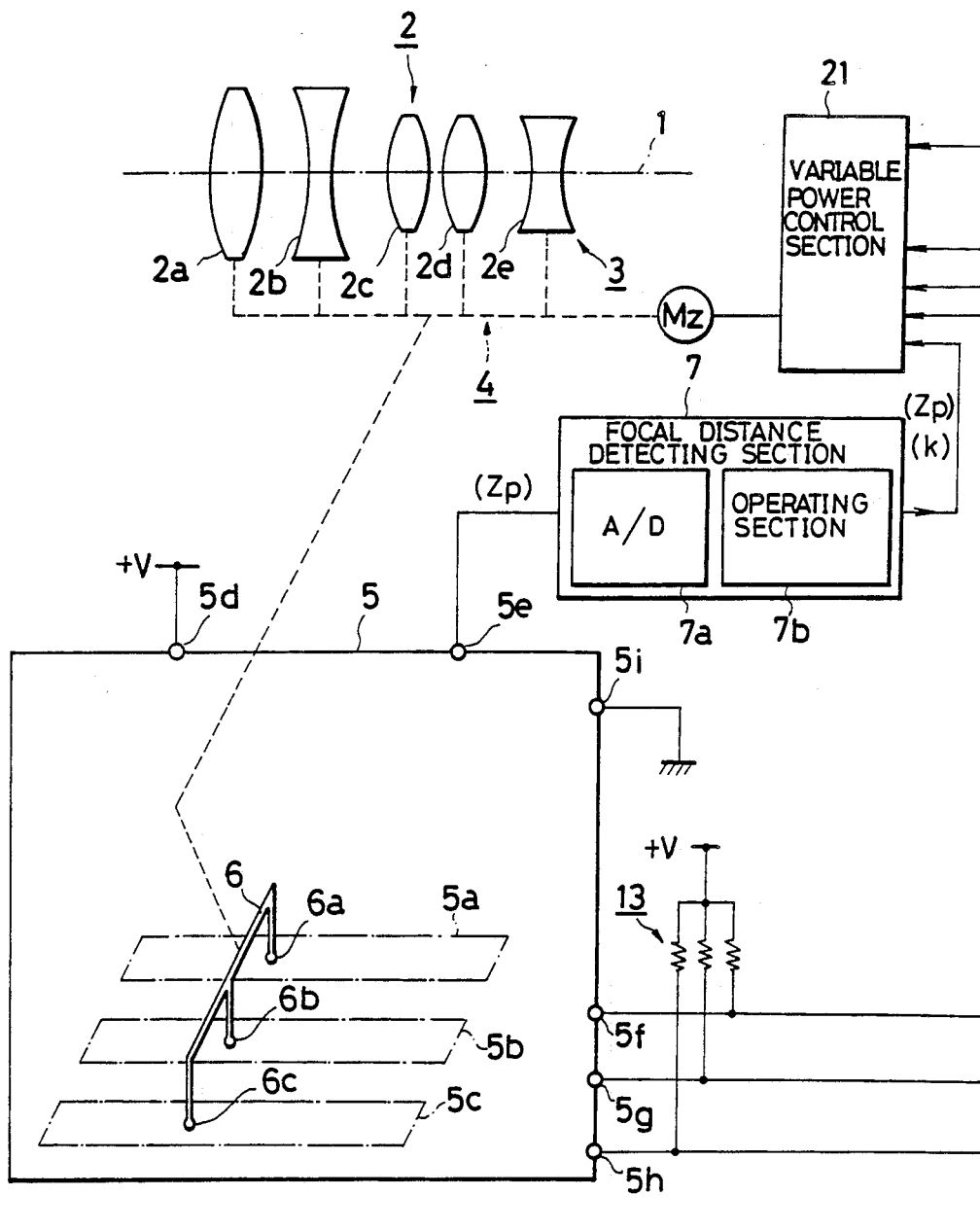

FIG. 1 is a block diagram showing the entire construction of the position detecting apparatus in accordance with the present invention.

In FIG. 1, variable power optical system 2 is disposed as a moving body on optical axis 1 thereof so as to be moved along optical axis 1. Variable power optical system 2 is constructed by first group of lenses 2a, second group of lenses 2b, third group of lenses 2c, fourth group of lenses 2d and fifth group of lenses 2e. These five lens groups may be respectively constructed by a single lens or a plurality of lenses. The fifth group of lenses 2e construct focusing lens group 3 and the first group of lenses 2a to the fifth group of lenses 2e constitute a variable power lens group and a macro lens group. The focal distance of the variable power lens group is designated by reference numeral f. Variable power drive section 4 is constructed by variable power motor Mz for driving zoom optical system 2 and an unillustrated mechanism section so as to respectively set this variable power optical system to one of three movable regions composed of a housing region for making variable power optical system 2 compact when the variable power optical system is not used, a variable power region for enabling the focal distance to be changed, and a macro region for enabling macro photographing. In particular, in the variable power region, zoom optical system 2 is constructed to be driven as a variable power lens group so as to set focal distance f to an arbitrary focal distance from the focal distance on the telescopic side (which is simply called "tele-position" in the following description) as a longest focal distance to the focal distance on the wide angle side(which is simply called "wide position" in the following description) as a shortest focal distance. In the macro region, variable power optical system 2 is acts as a macro lens group. Independently of the driving operation by variable power drive section 4, focusing lens group 3 is constructed to be driven and moved by a focus driving section composed of an unillustrated focus motor and mechanism section from the infinity to a near position, in which these positions correspond to the distance of a photographed object from the infinitely distant position ($\infty$ position) on optical axis 1 to the near position.

Discriminating pattern section 5 described in detail later comprises first, second and third patterns 5a, 5b and 5c as region discriminating pattern sections, respectively. Power source terminal 5d is connected to power source +V. Output terminal 5e outputs focal distance information(Zp) in proportion to focal distance f. Output terminals 5f, 5g and 5h respectively output discriminating information and are constructed to output variable power region signal(a), macro region signal (b) and housing region signal (c), respectively. Ground terminal 5i is connected to ground. Brush 6 is driven by variable power drive section 4 together with variable power optical system 2 and is constructed by contacts 6a, 6b and 6c integrally formed and composed of conductors and slidably contacting first, second and third patterns 5a, 5b and 5c, respectively.

Focal distance detecting section 7 as a first position detecting means receives the above focal distance information Zp and A/D converts this information by A/D converter 7a and outputs a converted signal. Focal distance detecting section 7 also performs a predetermined operation, e.g., a shift correction by operating section 7b and outputs this result as operating output (k).

General discriminating section 8, shown in FIG. 1(ii), as a second position detecting means receives the above respective region signals (a), (b) and (c) and outputs region signal (e) showing in which region variable power optical system 2 is located, and also outputs negative signal (NG) when variable power optical system 2 is not located in a constant position. General discriminating section 8 is constructed by mode detecting section 9, boundary end detecting section 10, macro position flag MFG and housing position flag SFG.

Disable judging section 11 receives the above macro region signal (b) and housing region signal (c) and negative signal (NG) and outputs disable signal (d) when it is impossible to perform the discrimination. Search section 12 receives this disable signal (d) and outputs search signal (f).

Pull-up resistors 13 are connected at one ends thereof in parallel to power source +V and are connected at the other ends thereof to respective output terminals 5f, 5g and 5h of discriminating pattern section 5.

Stop/reverse judging section 14 receives the above region signal (e) and stores a just-before driving direction to internal memory MR and performs a predetermined judgment described in detail later and respectively outputs stop signal (h), reverse signal (g) and inhibiting signal (i) based on this judged result.

All of momentary switches 15, 16 and 17 can be operated from the exterior of the apparatus and are closed only when these switches are pressed. Switches 15 and 16 are respectively a housing switch and a variable power/macro change-over switch(which is called a Z/M change-over switch in the following description) for switching the variable power and macro regions. Switch 17 is a multiplying change-over switch for setting the above focal distance f within the variable power region. Z/M change-over switch 16 is composed of variable power switch 16a and macro switch 16b, and multiplying change-over switch 17 is composed of a multiplying-up switch(which is simply called an "up-switch" in the following desicrption) 17a and a multiplying-down switch(which is simply called a "down-switch" in the following description) 17b. Multiplying change-over switch 17 is constituted to be effectively operated only when variable power optical system 2 is located within the above variable power region. Switch judging section 18 is connected to one end of respective switches 15, 16 and 17 and judges the operating states of these switches 15, 16 and 17 and outputs state signal (j) indicative of these operating states. Pull-up resistors 19 are connected at one ends thereof in parallel to power source +V and are connected at the other ends thereof to the above respective one ends of housing switch 15, variable power switch 16a, macro switch 16b, up-switch 17a and down-switch 17b. All the other ends of respective switches 15, 16a, 16b, 17a and 17b are connected to ground.

Inhibiting section 20 receives the above state signal (j) and does not output state signal (j) corresponding to the same direction as the above just-before driving direction in a period in which the inhibiting section receives the above inhibiting signal (i), and outputs the inputted state signal (j) as it is when the inhibiting section does not receive the above inhibiting signal (i). Variable power control section 21 respectively receives the output of this inhibiting section 20, operating output (k) of focal distance detecting section 7 and focal distance information (Zp), and region signal (e), search signal (f), reverse signal (g) or stop signal (h) to control the operation of zoom drive section 4. The input and output relations between the respective sections are shown by only main signals.

Figure 2:
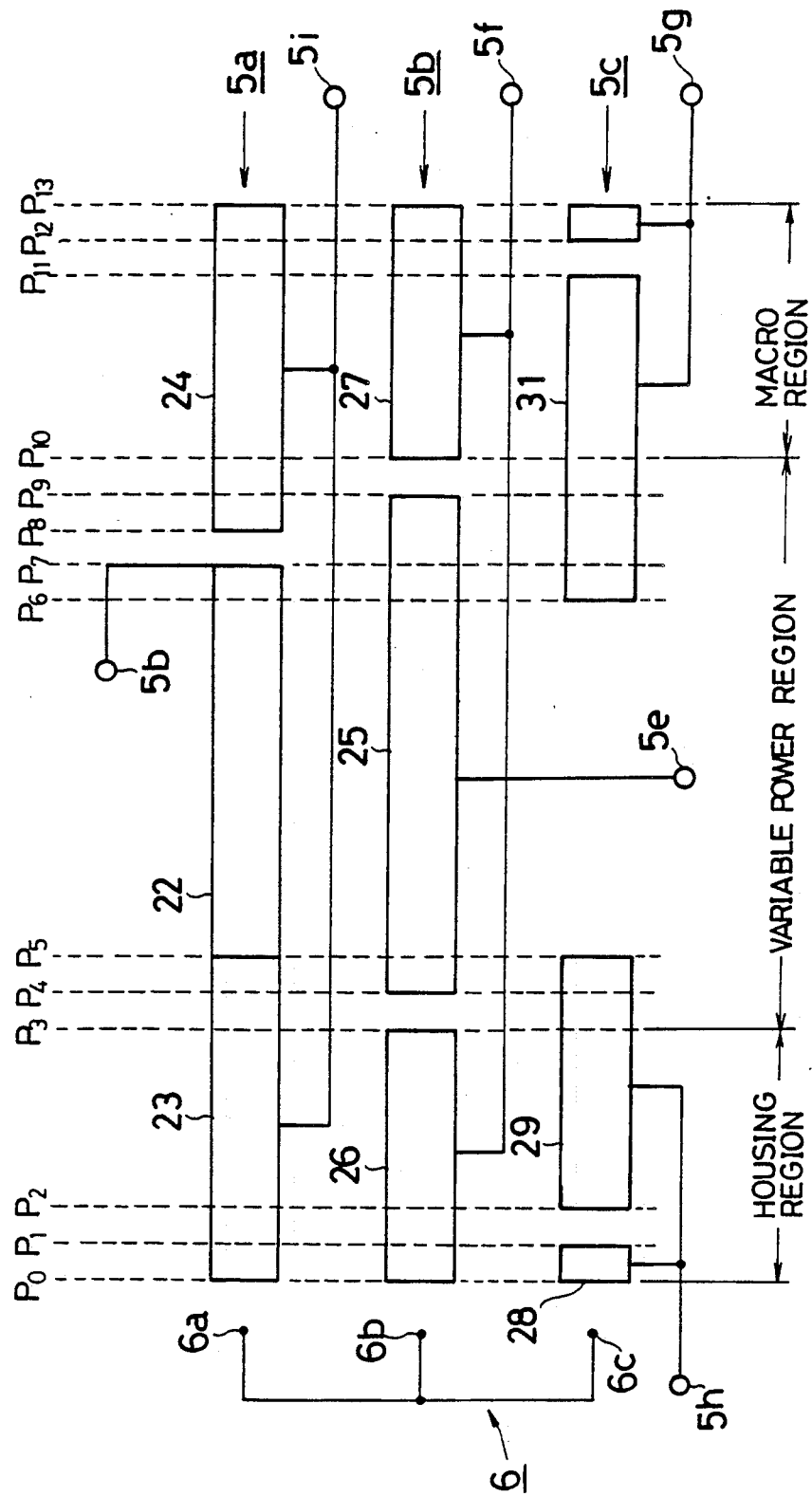
FIG. 2 is a view of a straight line pattern showing a detailed discriminating pattern section in the embodiment of the present invention shown in FIG. 1 and enlarging and developing a portion of the discriminating pattern section in the shape of a straight line.

FIG. 2 is a view of a straight line pattern developing and showing in detail discriminating pattern section 5 formed in the shape of an arc in FIG. 1. In FIG. 2, the same portions as those of FIG. 1 are designated by the same reference numerals and the explanation thereof is omitted in the following description.

In FIG. 2, patterns 22 to 24 constitute portions of first pattern 5a. Pattern 22 is a pattern for generating focal distance information(which is called a "Zp pattern" in the following description) as a resistance section composed of a resistor. Patterns 23 and 24 are composed of conductors and are ground patterns connected to ground terminal 5i. Patterns 26 and 27 constitute portions of second pattern 5b. Pattern 25 is composed of a conductor connected to output terminal 5e and is an electricity-collecting pattern for detecting a voltage(focal distance information Zp) generated in the Zp pattern 22 through contacts 6a and 6b of brush 6. Both patterns 26 and 27 are non-variable power patterns composed of conductors connected to output terminal 5f. Conductors 28 to 31 constitute portions of third pattern 5c. Patterns 28 and 29 are respectively a housing position pattern and a brake pattern composed of conductors connected to output terminal 5h. Patterns 30 and 31 are respectively a macro position pattern and a brake pattern composed of conductors connected to output terminal 5g.

The above-mentioned ground patterns 23, 24, electricity-collecting pattern 25, non-variable power patterns 26, 27, housing position pattern 28, brake patterns 29, 31, and macro position pattern 30 correspond to the conductive section.

Reference numeral $P_0$ designates positions of ground pattern 23, non-zoom pattern 26 and housing position pattern 28 at one ends thereof. Reference numeral $P_1$ designates a position of housing position pattern 28 at the other end thereof. Reference numeral $P_2$ designates a position of brake pattern 29 at one end thereof. Reference numeral $P_3$ designates a position of non-variable power pattern 26 at the other end thereof. $P_4$ designates a position of electricity-collecting pattern 25 at one end thereof. $P_5$ designates a position in which the other end of ground pattern 23 contacts one end of the Zp pattern, and a position of brake pattern 29 at the other end thereof. $P_6$ designates a position of brake pattern 31 at one end thereof. $P_7$ designates a position of Zp pattern 22 at the other end thereof in which the electric power is applied from power terminal 5d. $P_8$ designates a position of ground pattern 24 at one end thereof. $P_9$ designates a position of electricity-collecting pattern 25 at the other end thereof. $P_{10}$ designates a position of non-variable power pattern 27 at one end thereof. $P_{11}$ designates a position of brake pattern 31 at the other end thereof. $P_{12}$ designates a position of macro position pattern 30 at one end thereof. $P_{13}$ designates positions of ground pattern 24, non-variable power pattern 27 and macro position pattern 30 at the other ends thereof. Positions $P_7$ and $P_8$ show insulating sections constituting portions of first pattern 5a. Positions $P_3$, $P_4$ and positions $P_9$, $P_{10}$ show insulating sections constituting portions of second pattern 5b. Positions $P_1$, $P_2$ and positions $P_5$, $P_6$ and positions $P_{11}$, $P_{12}$ show insulating sections constituting portions of third pattern 5c. The distances between these positions are constituted to be narrow so as not to be short-circuited by respective contacts 6a, 6b and 6c of brush 6 except for the insulating sections in the above positions $P_5$ and $P_6$. A detecting region of brush 6 corresponds to positions $P_0$ to $P_{13}$. Positions $P_0$ to $P_3$ are called a housing region in the following description. Positions $P_3$ to $P_{10}$ are called a variable power region in the following description. Positions $P_{10}$ to $P_{13}$ are called a macro region in the following description. Further, positions $P_0$ to $P_1$ are called a housing position. Positions 1 to $P_2$ are called a housing approaching position. Positions $P_2$ to $P_3$ are called a housing continuing interval. Positions $P_3$ to $P_5$ and positions $P_8$ to $P_{10}$ are respectively called the above wide position and the above tele-position as boundary regions. Positions $P_5$ to $P_8$ is called a focal variable interval. Positions $P_{10}$ to $P_{11}$ is called a macro continuing interval. Positions $P_{11}$ to $P_{12}$ are called a macro approaching position. Positions $_{12}$ to $P_{13}$ are called a macro position. As can be seen from FIG. 2, positions $P_6$ to $P_7$ of Zp pattern 22 and the subsequent insulating section $P_7$ to $P_8$ overlap positions $P_6$ to $P_8$ of brake pattern 31. Namely, to prevent the potential of electricity-collecting pattern 25 from becoming indefinite when contact 6a of brush 6 is located in positions $P_7$ to $P_8$ of first pattern 5a, the voltage supplied to brake pattern 31 through pull-up resistors 13 of FIG. 1 is supplied to electricity-collecting pattern 25 through contacts 6c and 6b to prevent the focal distance information (Zp) outputted from output terminal 5e from becoming indefinite within the above focal variable region. The housing position flag SFG and the macro position flag MFG of FIG. 1 are constructed to be set when variable power optical system 2 is respectively located in the above housing and macro positions, and reset when variable power optical system 2 is located a position except for these positions.

Figure 3:
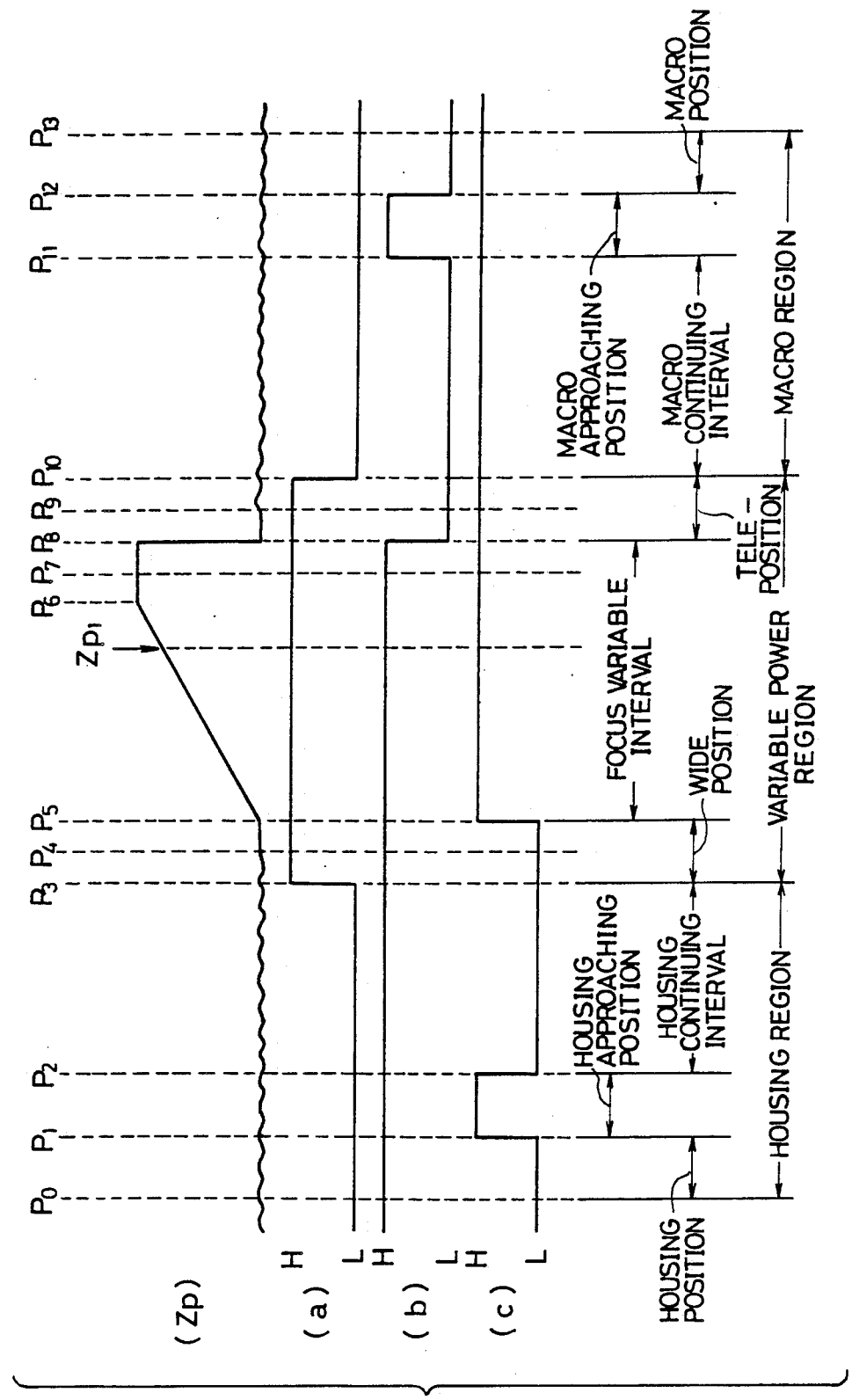
FIG. 3 is a timing chart showing operating waveforms of signals of respective constructional portions of FIG. 1.

FIG. 3 is a timing chart showing the change in waveforms of the respective constructional portions of FIG. 2 caused by the movement or reciprocation of brush 6. In FIG. 3, the same portions as those of FIGS. 1 and 2 are designated by the same reference numerals, and the explanation thereof is omitted in the following description.

In FIG. 3, focal distance information Zp is constructed by an analog signal, and all the other signals (a), (b) and (c) are signals having high and low levels in voltage. With respect to waveforms showing focal distance information Zp, wavy portions in positions $P_0$ to $P_4$ and positions 9 to $P_{13}$ designate portions in which the potential is uncertain.

With respect to the producing principle of the position of brush 6 and the respective waveforms, when brush 6 is located between positions $P_0$ and $P_1$ of FIG. 2 for example, ground pattern 23, non-variable power pattern 26 and housing position pattern 28 are respectively short-circuited by brush 6 through contacts 6a, 6b and 6c, and ground pattern 23 is connected to ground. Accordingly, variable power region signal (a) of output terminal 5f is at a low level in voltage, housing region signal (c) of output terminal 5h is also at a low level in voltage, and macro region signal (b) of output terminal 5g is pulled up by pull-up resistors 13. Brush 6 is located between positions $P_0$ and $P_1$ as mentioned above. Accordingly, brake pattern 31 and macro position pattern 30 are opened so that signal (b) attains a high level in voltage.

When the brush is located in positions $P_4$ to $P_5$, the potential (focal distance information (Zp)) of output terminal 5e is zero since electricity-collecting pattern 25 and ground pattern 23 are short-circuited by brush 6. When the brush is moved from position $P_5$ to position $P_6$, this potential is increased and approximately becomes power potential +V between positions $P_6$ and $P_8$.

Figure 4:
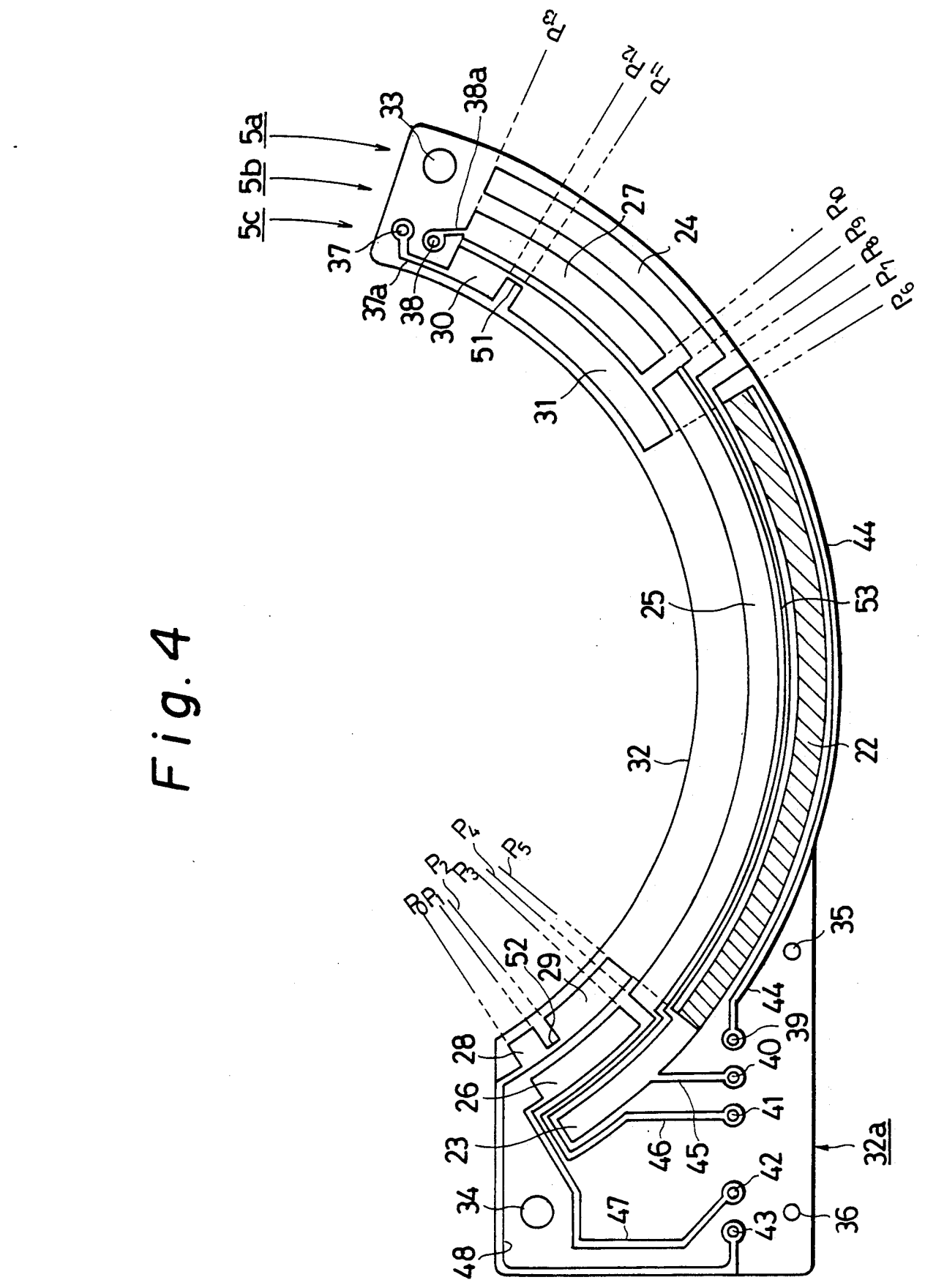
Figure 5:
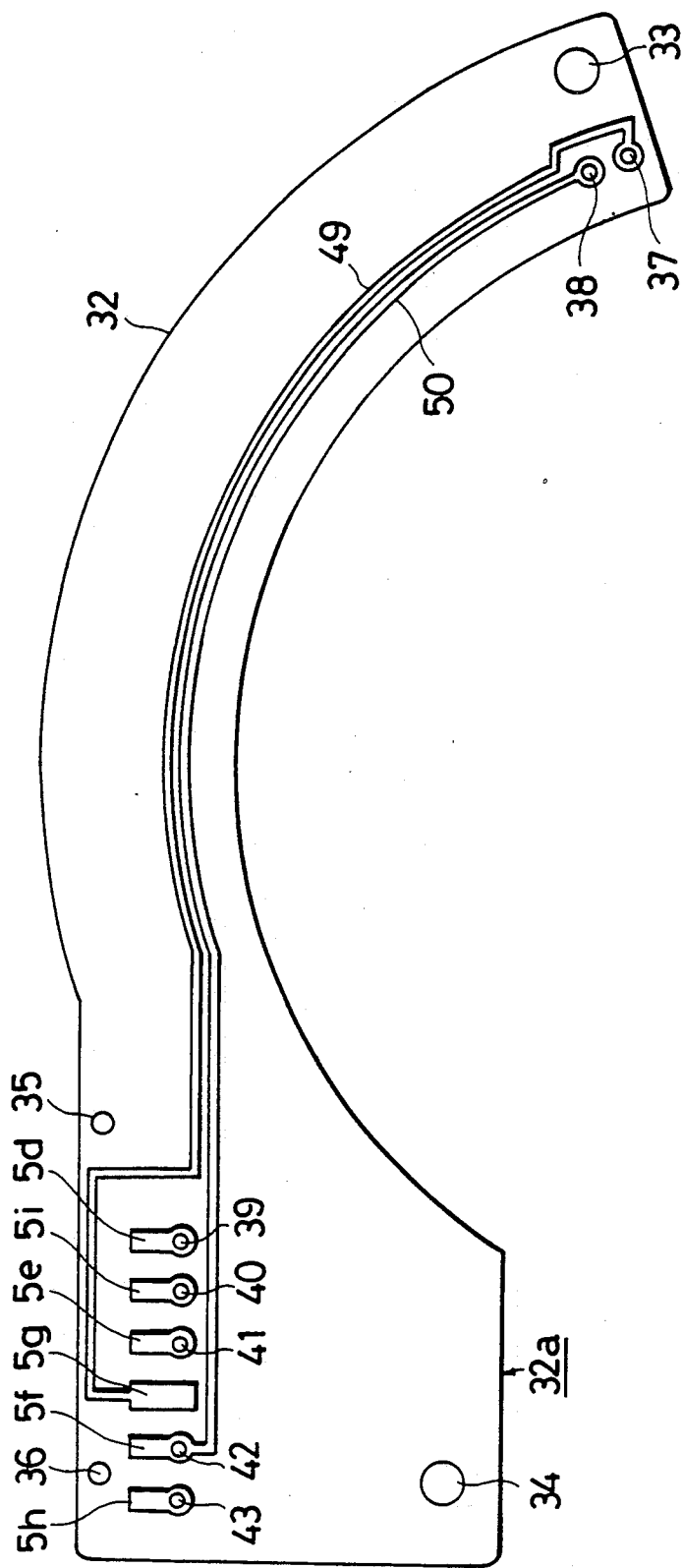

FIGS. 4 and 5 are respectively plan and bottom views showing a concrete construction of the discriminating pattern section shown in FIG. 1. In these figures, the same positions and portions as those in FIG. 2 are designated by the same reference numerals.

In FIGS. 4 and 5, substrate 32 is composed of a plate-shaped member made of an insulator and approximately formed in the shape of an arc. The face seen in FIG. 4 is called a front face and the face seen in FIG. 5 is called a rear face in the following description. Terminal portion 32a is formed in a left-hand end portion of substrate 32 in a rectangular shape. Attaching holes 33 and 34 are respectively disposed in a right-hand end portion of substrate 32 and an upper end portion of terminal portion 32a in FIG. 4. Connector attaching holes 35 and 36 are disposed in lower end portions of terminal portion 32a (upper end portions thereof in FIG. 5). Reference numerals 5a, 5b and 5c are first, second and third patterns already mentioned before. First pattern 5a is formed in the shape of a belt and in the circumferential direction on the outer circumferential side of substrate 32. Second pattern 5b is formed in the shape of a belt and in the circumferential direction in an approximately central portion of substrate 32. Third pattern 5c is formed in the shape of a belt and in the circumferential direction on the inner circumferential side of substrate 32. Conductors are attached onto the above power terminal 5d, ground terminal 5i, and output terminals 5e, 5g, 5f and 5h on the upper end side of the rear face of terminal portion 32a (on the lower end side thereof in FIG. 4), and are sequentially arranged in a so-called connector shape.

Through holes 37 and 38 are disposed in a right-hand end portion of substrate 32 and are formed by cylindrical conductors. Lead patterns 37a and 38a are composed of conductors attached onto substrate 32 and are respectively connected to a right-hand end portion of the macro position pattern and a right-hand end portion of non-variable power pattern 27 through circular portions contacting or connected to the outer circumferences of through holes 37 and 38. Through holes 39 to 43 are similar to the above through holes and are disposed in the above terminal portion 32a, and are respectively connected to the above power terminal 5d, ground terminal 5i, and output terminals 5e, 5f and 5h on the rear face of substrate 32 in FIG. 5.

Lead patterns 44 to 48 are connected at one ends thereof to the above through holes 39 to 43 on the above front side in FIG. 4 and are respectively connected at the other ends thereof to Zp pattern 22 in position $P_6$, ground pattern 23 near position $P_3$, electricity-collecting pattern 25 in position $P_4$, and nonvariable power pattern 26 and housing position pattern 28 in position $P_0$. Lead patterns 49 and 50 are attached to the above rear face and are respectively connected at ends thereof to through holes 37 and 38 and are respectively connected at the other ends thereof to output terminal 5g and 5f. Junction pattern 51 is composed of a conductor for connecting brake pattern 31 and macro position pattern 30 to each other between positions $P_{11}$ and $P_{12}$. Junction pattern 52 connects housing position pattern 28 and brake pattern 29 to each other between positions $P_1$ and $P_2$. Junction pattern 53 connects ground patterns 23 and 24 to each other between positions $P_5$ to $P_8$. Junction patterns 51 to 53 and lead patterns 37a,38a and 44 to 48 are constructed so as not to contact the brush described later.

Figure 6:
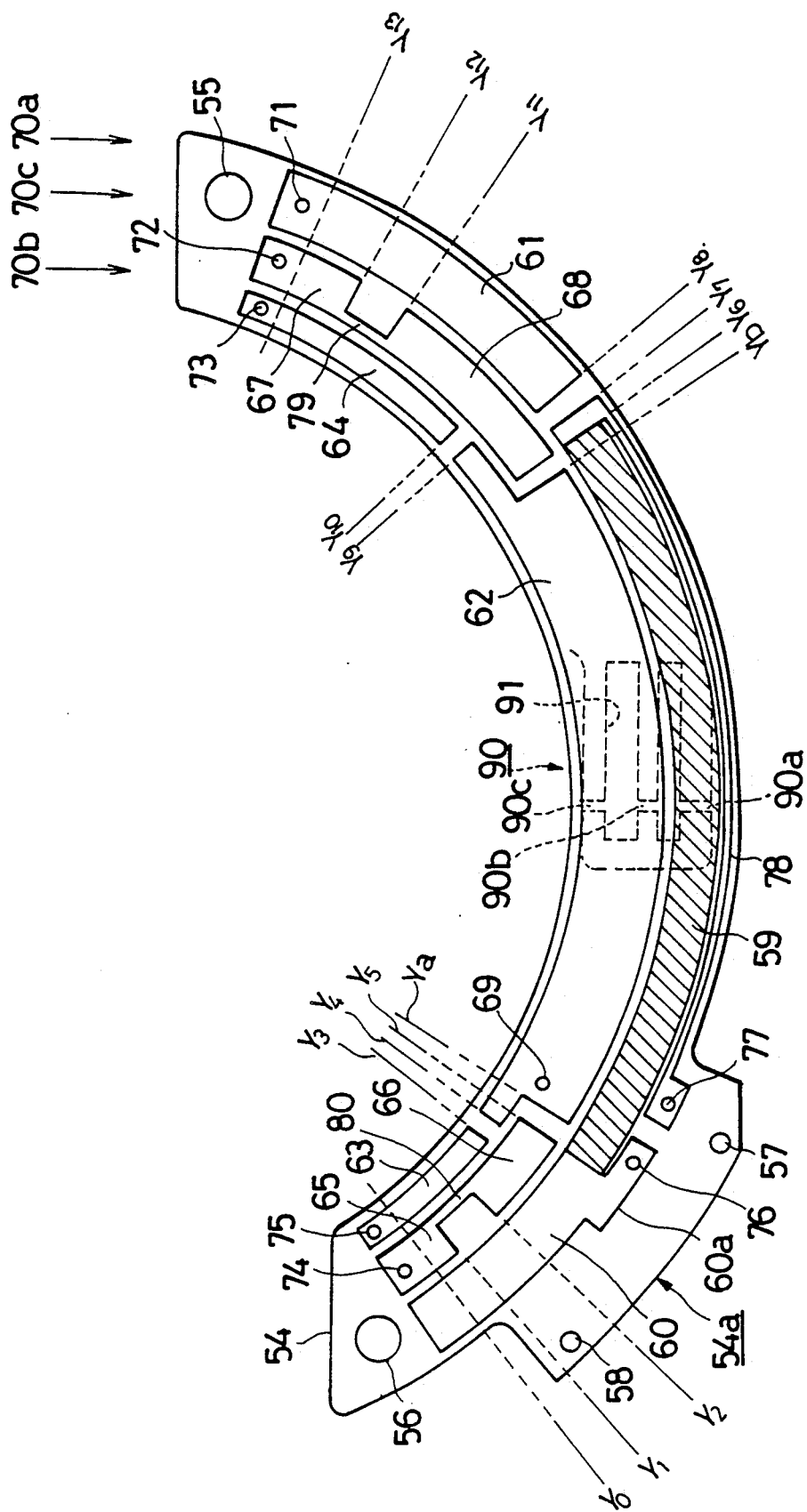
FIGS. 6 and 7 are respectively plan and bottom views showing another concrete construction of a discriminating pattern section different from that shown in FIGS. 4 and 5.
Figure 7:
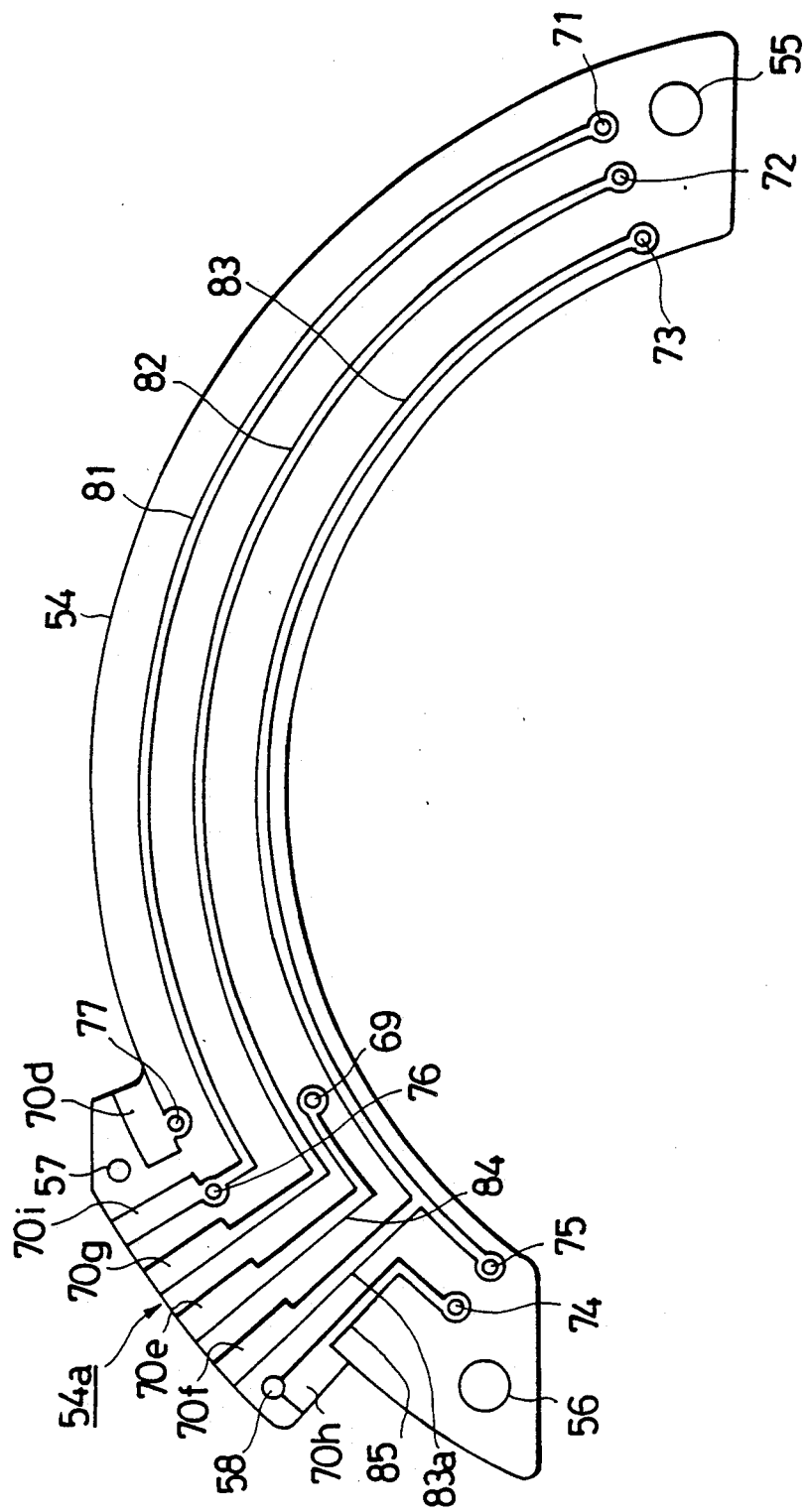

FIG. 6 and 7 are respectively plan and bottom views showing a concrete construction of a discriminating pattern section different from that shown in FIGS. 4 and 5. The construction shown in FIGS. 6 and 7 is only partially different from that shown in FIGS. 4 and 5, and therefore members similar to those in FIGS. 4 and 5 are designated by the same members and only the different construction with respect to these members is explained in the following description.

In FIGS. 6 and 7, reference numeral 54 is a substrate and terminal portion 54a is formed to further project in the shape of an arc from the outer circumference of substrate 54 on the left-hand end side thereof. Positions $Y_0$ to $Y_{13}$ correspond to the above positions $P_0$ to $P_{13}$. Reference numeral 59 is a Zp pattern and reference numerals 60 and 61 are ground patterns as pattern portions in a flat shape. Electricity-collecting pattern 62 as a pattern portion in a flat shape is formed to extend to a second pattern described later such that the width of this pattern between positions $Y_a$ and $Y_b$ (length in the radial direction) is approximately doubled in comparison with that of electricity-collecting pattern 25 in FIG. 4. Reference numerals 63 and 64 are non-zoom patterns, and reference numerals 65 and 66 are respectively a housing position pattern and a brake pattern. Reference numerals 67 and 68 are respectively a macro position pattern and a brake pattern, and through hole 69 is disposed in a left-hand end portion of the above electricity-collecting pattern 62 and in an approximately central portion thereof in the radial direction. Reference numerals 70a, 70b and 70c are respectively first, second and third patterns. Second pattern 70b is disposed on the inner circumferential side of substrate 54 and third pattern 70c is disposed in the central portion of substrate 54 so that the arrangement of these patterns is reverse to that of second patterns 5b and 5c in FIG. 4.

Reference numeral 70d is a power terminal and output terminals 70e, 70f, 70g and 70h respectively correspond to output terminals 5e, 5f, 5g and 5h shown in FIG. 5, and reference numeral 70i is a ground terminal. With respect to the arrangement in terminal portion 54a, output terminals 5e and 5g are sequentially arranged towards the left-hand end side of substrate 32 in FIG. 5, but output terminals 70g and 70e are sequentially arranged in this embodiment, which is reverse with respect to the arrangement.

Through holes 71, 72 and 73 are respectively disposed in right-hand end portions of ground pattern 61, macro position pattern 67 and non-variable power pattern 64 on the outer side of these right-hand end portions from position $Y_{13}$ in the circumferential direction. Through holes 74 and 75 are respectively disposed in left-hand end portions of housing position pattern 65 and non-zoom pattern 63 on the outer side from position $Y_0$ in the circumferential direction. Through holes 76 and 77 are disposed in terminal portion 54a slightly separated from the outer circumference of first pattern 70a. Through hole 76 connects ground terminal 70i and lead pattern 60a connected to ground pattern 60 on the front and rear faces of substrate 54, and through hole 77 is connected to power terminal 70d on the rear face in FIG. 7. Lead pattern 78 corresponds to lead pattern 44 shown in FIG. 4. Junction patterns 79 and 80 respectively correspond to junction patterns 51 and 52 shown in FIG. 4. A junction pattern corresponding to junction pattern 53 shown in FIG. 4 is omitted on the front face in this embodiment of FIG. 6. Further, lead patterns corresponding to lead patterns 46 to 48 in FIG. 4 are also omitted on the front face.

Junction pattern 81 connects through holes 71 and 76 to each other and lead pattern 82 connects through hole 72 and output terminal 70g to each other. Junction pattern 83 connects through holes 73 and 75 to each other and is further connected to output terminal 70f through lead pattern 83a. Lead pattern 84 connects through hole 69 and output terminal 70e to each other and lead pattern 85 connects through hole 74 and output terminal 70h to each other.

In this embodiment, junction patterns 81 and 83 correspond to junction patterns 53 and 50 mentioned above. Lead patterns 60a, 82, 83a, 84 and 85 respectively correspond to lead patterns 45, 49, 47, 46 and 48 mentioned above. Junction pattern 81 and lead pattern 84 constitute a lead section.

A portion of the brush described in the following description is shown by the dotted line in FIG. 6.

Figure 8:
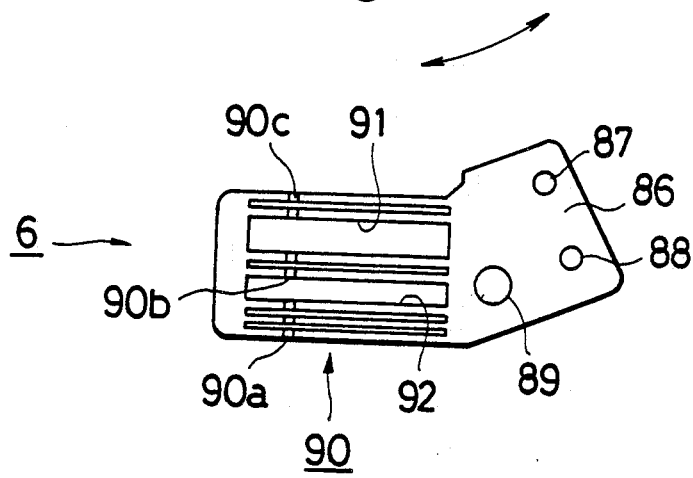
FIGS. 8 and 9 are respectively plan and side views showing the construction of a brush used in the present invention.
Figure 9:
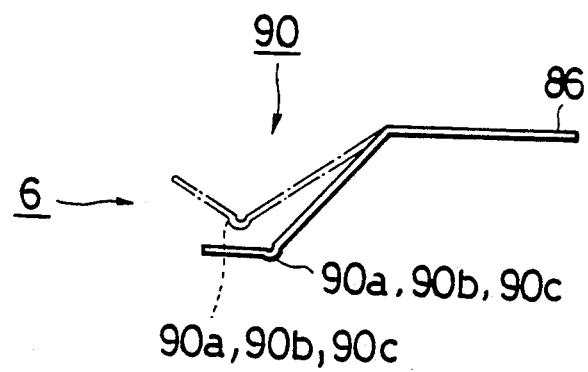

FIGS. 8 and 9 are respectively plan and side views showing the construction of brush 6 shown in FIG. 1 and applied to the embodiment shown in FIGS. 4 and 6. In FIGS. 8 and 9, attaching portion 86 approximately has the same width as that of the above substrates 32 and 54 in the radial direction and is formed along the outer and inner circumferences of substrates 32 and 54. Attaching holes 87 and 88 are disposed in this attaching portion 86 to attach brush 6 to variable power drive section 4 in FIG. 1. Positioning hole 89 is similarly disposed in attaching portion 86. Contact portion 90 is composed of an elastic conductor and is formed to have a predetermined inclination from the left-hand end side of attaching portion 86. Contacts 90a, 90b and 90c are formed to project contact portion 90 downwards in a predetermined position thereof in the shape of an arc having a small diameter. When contacts 90a, 90b and 90c are applied to the embodiment of FIG. 4, these contacts 90a, 90b and 90c respectively correspond to contacts 6a, 6b and 6c. when contacts 90a, 90b and 90c are applied to the embodiment of FIG. 6, contacts 90a, 90b and 90c respectively correspond to contacts 6a, 6c and 6b since second pattern 70b and third pattern 70c are reverse to each other. Namely, contacts 90a, 90b and 90c respectively slidably contact first pattern 5a, second pattern 5b and third pattern 5c thereon in the case of the embodiment of FIG. 4, and respectively slidably contact first pattern 70a, third pattern 70c and second pattern 70b thereon in the case of the embodiment of FIG. 6. Escape holes 91 and 92 are formed by respectively cutting off a portion between contacts 90c and 90b and a portion between contacts 90b and 90a in a rectangular shape in the longitudinal direction of contact portion 90. These escape holes 91 and 92 adjust the elasticity of contact portion 90 and especially escape hole 91 is constructed such that through hole 69 of FIG. 6 is located within this hole 91. Namely, when brush 6 passes Zp pattern 59 thereon, through hole 69 is constructed in a position relation in which escape hole 91 passes this hole 69 thereon. A free state of contact portion 90 is shown by the solid line in FIG. 9 and a sliding contact state (used state) of contact portion 90 is shown by the one-dotted chain line in FIG. 9. The sliding direction of brush 6 is shown by the arrow shown in FIG. 8.

Figure 10I:
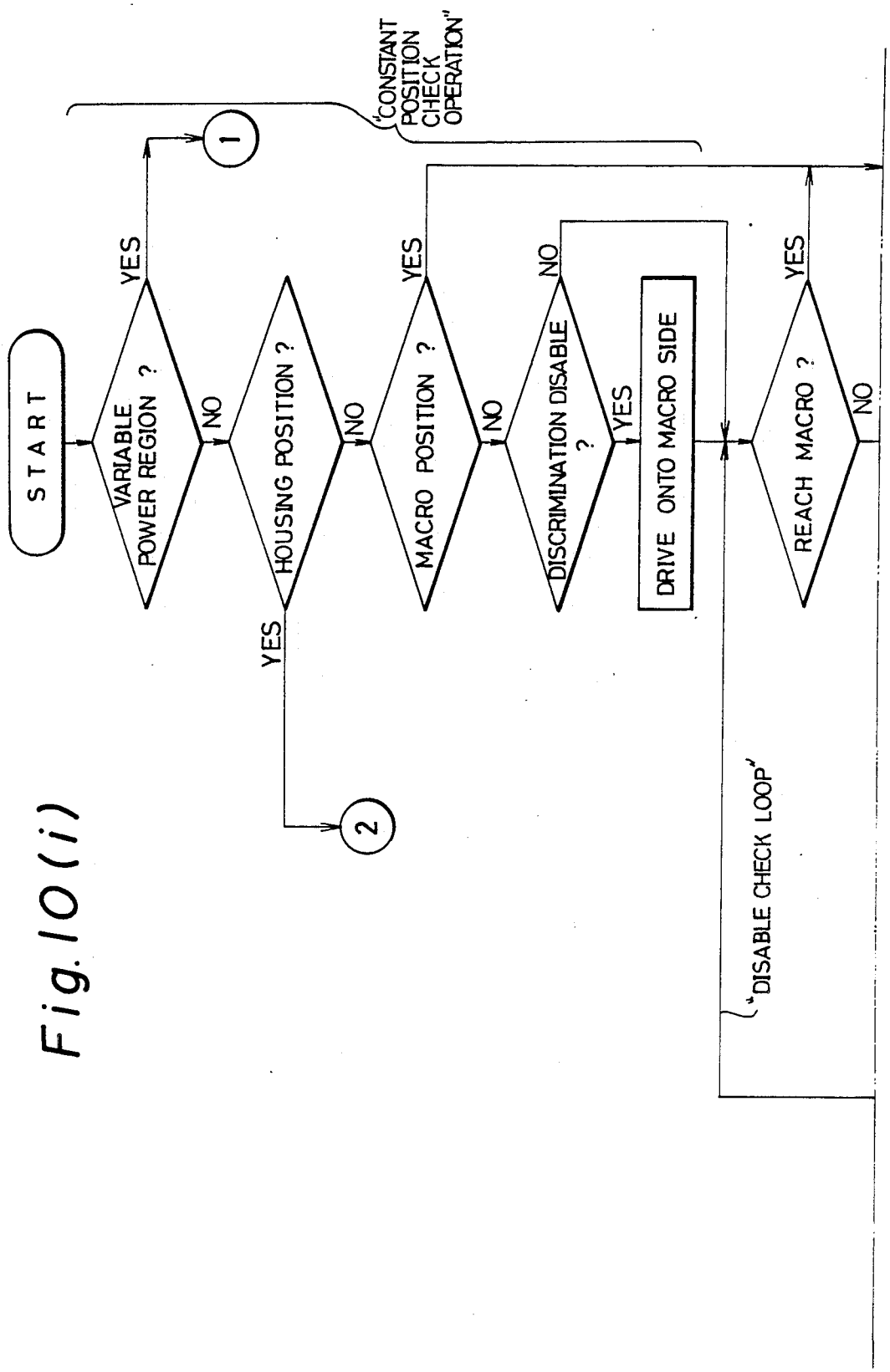
Figure 10:
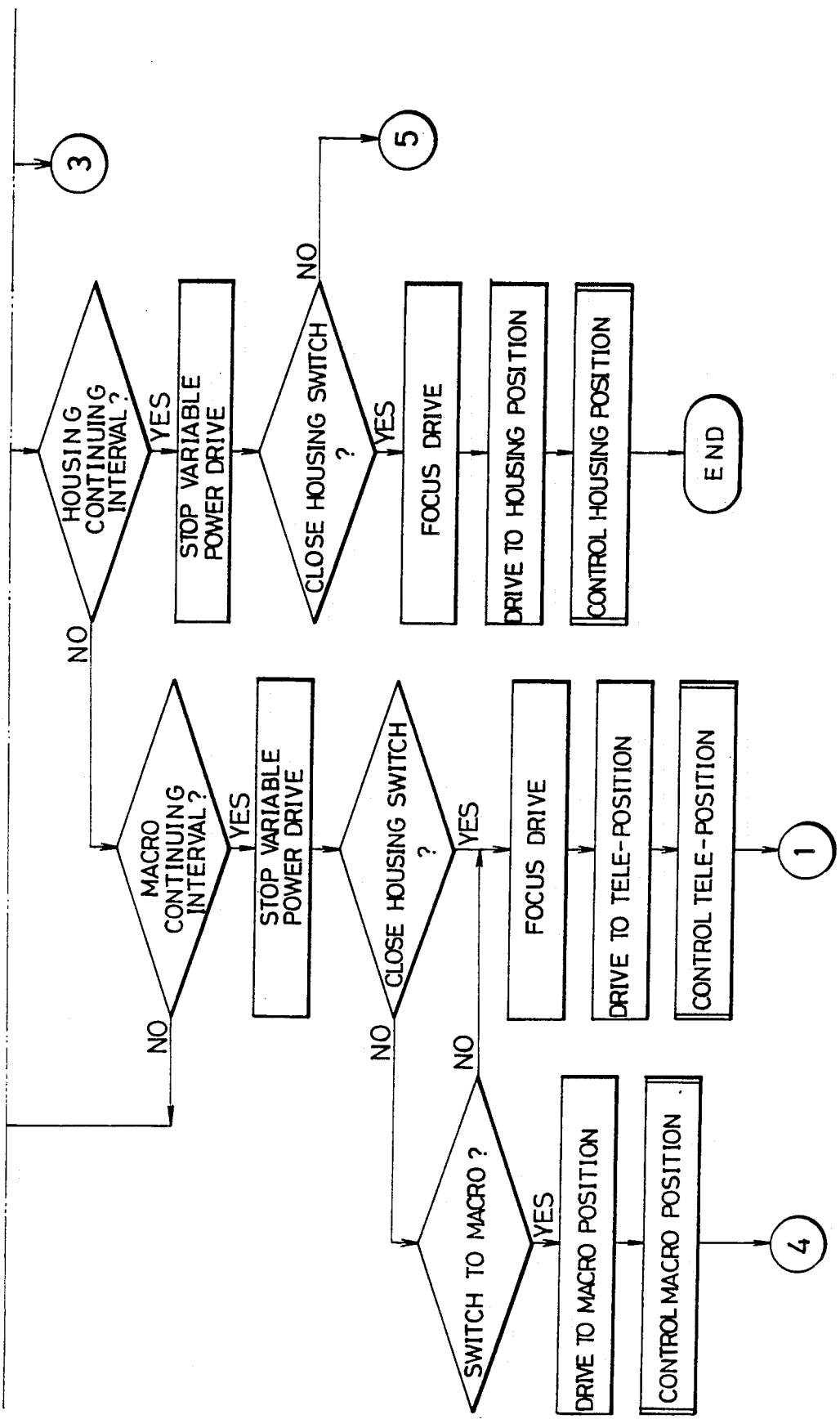
Figure 11I:
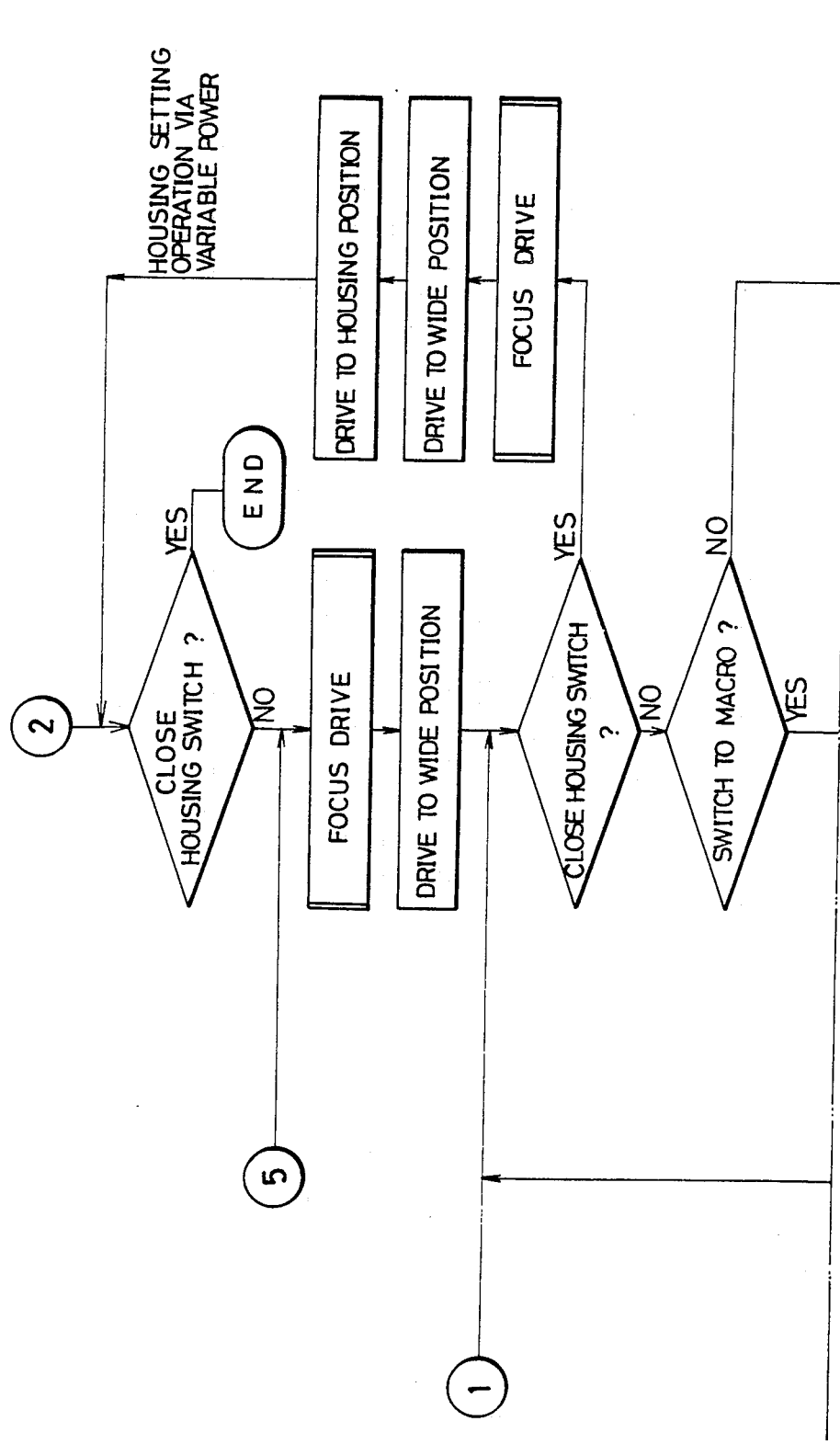

FIGS. 10 to 12 are flow charts showing the operational sequence of the apparatus shown in FIG. 1. FIGS. 10 and 11 show main routines and FIG. 12 shows a subroutine by an interrupting processing and the content of this subroutine is a stop control (which is simply called "ZMB" in the following description) within the variable power region (both ends thereof). This interrupting processing is started when multiplying change-over switch 17 is operated and macro region signal (b) or housing region signal (c) attains the low level in voltage.

The operation of the main routine shown in FIGS. 10 and 11 is constructed to be started from a time point when housing switch 15 or Z/M change-over switch 16 is operated (closed). The constructions of FIGS. 10 to 12 will be described together with the following explanation with respect to the operation and are therefore omitted here.

The operation of the apparatus in the embodiment of the present invention constructed as above will now be described along the flow charts of FIGS. 10 and 11. Discriminating pattern section 5 is assumed to be the one shown in FIGS. 4 and 5 in the following description.

Various kinds of operations by respective switches 15, 16 and 17 are described with respect to only typical ones relating to the features of the present invention.

First, the description is made with respect to the operation for setting a region by the operation of housing switch 15. Brush 6 and variable power optical system 2 before the start of the operation are assumed to be located in the macro approaching position, i.e., in positions $P_{11}$ to $P_{12}$ in FIGS. 2 and 3. Accordingly, in FIG. 4, contacts 90a, 90b and 90c are located between positions $P_{11}$ and $P_{12}$. When housing switch 15 is operated, switch judging section 18 judges that this input is an input from housing switch 15, thereby starting the above operation for setting the region. Namely, the flow chart is started from step START of FIG. 10. First, in first condition step "variable power region?", mode detecting section 9 of general discriminating section 8 checks variable power region signal (a). As can be seen from FIG. 3, this variable power region signal (a) is at the high level in voltage in only the variable power region from position $P_3$ to position $P_{10}$. This signal (a) is at the low level in voltage in positions $P_{11}$ to $P_{12}$ so that it is judged that signal (a) is not in the variable power region and therefore this judgment is NO. In the next condition step "housing position?", mode detecting section 9 similarly checks the housing position flag SFG and is reset when this flag is not located in positions $P_0$ to $P_1$ as mentioned above so that this judgment is NO. In the next condition step "macro position?", mode detecting section 9 similarly checks the macro position flag MFG and is similarly reset so that negative signal (NG) is outputted and this judgment is NO. The operations from START to this step are called a "constant position check operation" in the following description. Namely, by this constant position check operation, variable power optical system 2 is now judged not to be located in any one of the housing positions as a constant position, the macro position and the variable power region so that negative signal (NG) indicative of this state is outputted from general discriminating section 8. However, such a state, in which variable power optical system 2 is not located in the above constant position, does not occur on design, but it is possible that variable power optical system 2 is stopped in an unexpected position by an external force (by manually pushing this variable power optical system 2) for example or an obstacle, etc.

In the next condition step "discrimination disable ?", disable judging section 11 checks the levels in voltage of macro region signal (b) and housing region signal (c) inputted from a time point when disable judging section 11 receives negative signal (NG) from general discriminating section 8. Namely, by the above constant position check operation, it is already judged that variable power optical system 2 is located in either positions $P_1$ to $P_3$ or positions $P_{10}$ to $P_{12}$. Accordingly, it is judged whether or not the above both signals (b) and (c) are at the high level in voltage. Namely, in this case, both signals (b) and (c) are at the high level in voltage so that the judgment (discrimination) about either positions $P_1$ to $P_2$ or positions $P_{11}$ to $P_{12}$ is disabled. Accordingly, disable judging section 11 outputs disable signal (d) indicative of this state. Search section 12 receives this signal and outputs search signal (f) in the next condition step "drive onto the macro side". Variable power control section 21 receives this signal and rotates variable power motor Mz so that variable power optical system 2 is moved onto the side of macro positions $P_{12}$ to $P_{13}$ through variable power drive section 4. Accordingly, brush 6 located between positions $P_{11}$ and $P_{12}$ begins to be moved onto the side of position $P_{13}$, but it is assumed that brush 6 is still located within positions $P_{11}$ to $P_{12}$. Accordingly, in the next condition step "reach macro?" of the flow chart, it is judged whether or not variable power optical system 2 and brush 6 reach macro positions $P_{12}$ to $P_{13}$ and this judgment is NO. In the next condition step, shown in FIG. 10(ii), "housing continuing interval?", it is judged whether or not variable power optical system 2 and brush 6 are moved to the housing continuing interval of positions $P_2$ to $P_3$, and this judgment is NO. Further, in the next condition step "macro continuing interval?", it is judged whether or not variable power optical system 2 and brush 6 are located in the macro continuing interval of positions $P_{10}$ to $P_{11}$, and this judgment is NO, thereafter returning to the above condition step "reach macro?" again. The operation of this loop is called a "disable check loop" in the following description. With respect to the content of condition step "reach macro?" within the disable check loop, brush 6 is located in positions $P_{11}$ to $P_{12}$ at the present time so that macro region signal (b) is at the high level in voltage. Accordingly, general discriminating section 8 interrupts the supply of an electric current to variable power motor Mz similar to the above case and monitors that brush 6 passes position $P_{12}$ and attains the low level in voltage. General discriminating section 8 stops the operation of the motor by braking it at a time point when brush 6 reaches macro positions $P_{12}$ to $P_{13}$, and sets the macro position flag MFG and stores that variable power optical system 2 is located in the macro position as one constant position. In step "reach macro?" of FIG. 10 again, variable power optical system 2 has reached the macro position and the judgment is thereby YES.

Housing switch 15 is closed in the present state so that the flow chart is changed from mark 3 of FIG. 10(ii) to mark 3 of FIG. 11(ii). In the next step "close housing switch?", the judgment is YES and the command "focus drive" is executed. In the next step "drive to tele-position", variable power control section 21 begins to move variable power optical system 2 to tele-positions $P_8$ to $P_{10}$ with reference to region signal (e) indicating that variable power optical system 2 and brush 6 are located in macro positions $P_{12}$ to $P_{13}$ and state signal (j) indicating that housing switch 15 inputted through inhibiting section 20 is closed. First, a macro escaping operation is briefly described. Variable power optical system 2 located in macro positions $P_{12}$ to $P_{13}$ is moved onto the tele-position side and macro region signal (b) changed thereby is checked. When macro region signal (b) passes high voltage level portions of macro approaching positions $P_{11}$ to $P_{12}$, the macro flag MFG previously set is reset and it is indicated that variable power optical system 2 is already not located in macro positions $P_{12}$ to $P_{13}$. Next, an operation for controlling the tele-position is performed and it is judged whether region signal (b) is at the low level in voltage or not, and it is confirmed that variable power optical system 2 is located in continuing interval of positions $P_{10}$ to $P_{11}$. Further, the rise of variable power region signal (a) in position $P_{10}$ is monitored. When variable power optical system 2 reaches position $P_{10}$, the operation of variable power motor Mz is stopped and an electromagnetic brake is applied thereto. Then, the drive of variable power optical system 2 in the macro direction with respect to multiplying change-over switch 17 is stopped.

The operation in step "focus drive" is an operation for moving focus lens group 3 to the ∞ position by an unillustrated focus drive section. This operation is an operation for conforming the direction of focusing lens group 3 when this focusing lens group is moved to the focusing position to be focused in the variable power region and the macro region. However, this operation does not directly relate to the features of the present invention, and therefore the explanation thereof is omitted with respect to step "focus drive" of the flow chart in the following description.

With respect to the main routine of FIG. 11, the flow chart proceeds from step "drive to tele-position" to the next condition step "close housing switch?". In the following description, the operations of "focus drive" and "drive to tele-position" are called an "operation for setting tele-position". The judgment in this condition step is YES. In the condition step "drive to wide position" through the next step "focus drive, variable power optical system 2 begins to be moved from tele-positions $P_8$ to $P_{10}$ onto the side of wide positions $P_3$ to $P_5$ again. In this case, the stoppage of the variable power optical system with respect to the wide positions is controlled by the operation for controlling the wide positions. Namely, when the level in voltage of housing region signal (c) is checked and variable power optical system 2 is driven and reaches position $P_5$, the operation of variable power motor Mz is stopped and braked. Further, it is judged whether variable power region signal (a) is lowered in voltage or not, and it is confirmed that variable power optical system 2 is stopped within wide positions $P_3$ to $P_5$. Further, multiplying change-over switch 17 is inhibited from being operated again in the same direction(macro direction). In FIG. 11, in the next condition step "drive to housing position", variable power optical system 2 begins to be moved from wide positions $P_3$ to $P_5$ onto the side of housing positions $P_0$ to $P_2$, and is stopped in the housing positions. The operations from the above "focus drive" through "drive to wide position" to "drive to housing position" are called a "housing setting operation via variable power in the following description. When this housing setting operation via zoom has been completed, the judgment in the next step "close housing switch?" is YES and the region setting operation is completed in step END. Namely, as can be seen from the above-mentioned operations, even when variable power optical system 2 and brush 6 are located in macro approaching positions $P_{11}$ to $P_{12}$ in which the discrimination of the region is disabled, housing switch 15 is operated and thereby variable power optical system 2 and brush 6 are moved once to macro positions $P_{12}$ to $P_{13}$ in which the discrimination of the region can be performed, thereafter moving and positioning the variable power optical system and the brush into housing positions $P_0$ to $P_1$ again.

The above operations will next be described briefly corresponding to FIG. 4. Contacts 90a, 90b and 90c located between positions $P_{11}$ and $P_{12}$ are moved once to a position between positions $P_{12}$ and $P_{13}$ and are then moved to a position between positions $P_0$ and $P_1$.

Further, corresponding to FIG. 6, contacts 90a, 90b and 90c located in positions $Y_{11}$ to $Y_{12}$ are moved once to a position between positions $Y_{12}$ and $Y_{13}$ and are moved therefrom towards a position between positions $Y_0$ and $Y_1$. Contacts 90b and 90c contact electricity-collecting pattern 62 between positions $Y_a$ and $Y_b$ so that the contact area is approximated doubled. Further, when contact portion 90 passes the second and third patterns thereon, escape hole 91 passes through hole 69 thereon so that the operation of brush 6 is not prevented at all.

Next, the region setting operation will be described in the case in which only variable power switch 16a of Z/M change-over switch 16 is operated. The content in step "variable power focus" of the subroutine in FIG. 11 comprises the focusing control of focusing lens group 3, the focus setting operation for setting the focal distance by multiplying change-over switch 17 and a photographing operation by an unillustrated release switch, etc., when variable power optical system 2 is located in variable power region $P_5$ to $P_{10}$ for example, although such a condition is not shown in FIG. 11.

It is now assumed that variable power optical system 2 and brush 6 are located in housing approaching positions $P_1$ to $P_2$ and only variable power switch 16a is operated. In the flow chart, the constant position check operation and the next step "drive onto the macro side" of FIG. 10 are executed and the flow chart next proceeds to the above-mentioned disable check loop. At a time point when brush 6 passes position $P_2$ and housing region signal (c) is lowered in voltage, the judgment in step "housing continuing interval?" within the disable check loop is YES and the next step "stop variable power drive" is executed. Thereafter, the judgment in the next step "close housing switch?" is NO and it proceeds to mark ⑤. Then, it proceeds to mark ⑤ of FIG. 11(i) and zoom optical system 2 is set from position $P_2$ to wide positions $P_3$ to $P_5$ by the next steps "focus drive" and "drive to wide position". The judgment in the next step "close housing switch" is NO and the judgment in step "switch to macro?" is NO and it proceeds to step "variable power focus" of the above subroutine. Thereafter, a predetermined operation is performed and it proceeds to step END so that all the operations have been completed.

With respect to only the operational results in the other cases, when variable power optical system 2 is located in macro region $P_{10}$ to $P_{13}$, it is set to telepositions $P_8$ to $P_{10}$ in the zoom region as a result. When variable power optical system 2 is located in housing region $P_0$ to $P_3$, it is set to wide positions $P_3$ to $P_5$ of the variable power region. When variable power optical system 2 is located in variable power region $P_3$ to $P_{10}$, no setting operation is naturally performed.

Next, in the focus setting operation by multiplying change-over switch 17, an operation in the vicinity of the boundary of the region will be especially described. Accordingly, this operation is an operation within step "variable power focus" of the subroutine of FIG. 11. It is now assumed that variable power optical system 2 and brush 6 are located in an intermediate arbitrary position of the variable power region. Further, for example, up-switch 17a is assumed to be operated. Switch judging section 18 outputs state signal (j) indicative of the direction for increasing the magnification through inhibiting section 20. Variable power control section 21 receives this state signal and confirms that variable power optical system 2 is located in the variable power region with reference to region signal (e), and begins to move variable power optical system 2 and brush 6 onto the side of telepositions $P_8$ to $P_{10}$ through variable power drive section 4. Focal distance detecting section 7 A/D-converts the inputted focal distance information (Zp) by A/D converter 7a and outputs this information (Zp) as a signal. When variable power optical system 2 comprises a varifocal lens, focal distance detecting section 7 calculates a shift correction amount by operating section 7b and outputs this result as operating output (k). In particular, this operational output (k) is also outputted to the unillustrated focus drive section and focal distance detecting section 7 suitably performs the shift correction in association with variable power control section 21. Since variable power optical system 2 is still located in the intermediate position of the variable power region, stop/reverse judging section 14 receiving region signal (e) outputted from general discriminating section 8 does not output any one of reverse signal (g), stop signal (h) and inhibiting signal (i). At a time point when variable power optical system 2 is moved from the above intermediate position to position $P_8$ and macro region signal (b) is lowered in voltage, the subroutine ZMB by the interrupting processing of FIG. 12 is started. At this time, stop/reverse judging section 14 stores the just-before drive direction in which variable power optical system 2 is driven to internal memory MR. In step "brake variable power motor" of FIG. 12, boundary end detecting section 10 of general discriminating section 8 outputs region signal (e) indicative of the detection of position $P_8$ as one end portion of the boundary region. Stop/reverse judging section 14 receives this region signal (e) and outputs stop signal (h).

Variable power control section 21 receives this signal (h) and interrupts the supply of an electric current to variable power motor Mz and applies an electromagnetic brake thereto. In the next condition step "brake completion?" of FIG. 12, the judgment is NO for a predetermined time and the braking operation is continued. Thereafter, this judgment becomes YES and stop/reverse judging section 14 receives region signal (e) in the next condition step "variable power region?". Thus, it is judged whether or not variable power optical system 2 is located within the variable power region. Namely, it is judged whether or not an overrunning operation is performed with respect to variable power optical system 2 and thereby variable power optical system 2 exceeds position $P_{10}$ as a boundary of the teleposition and is moved into the macro region. Here, no overrunning operation is assumed to be performed and therefore the judgment in this step is YES. In the next condition step "Is signal (c) at low level?", since variable power optical system 2 is now stopped within telepositions $P_8$ to $P_{10}$, the level in voltage of housing region signal (c) is judged and the judgment in this step is NO. In the next condition step "Is signal (b) at low level ?", the level in voltage of macro region signal (b) is judged and the judgment in this step is YES. In the next step "inhibit macro direction", stop/reverse judging section 14 outputs inhibiting signal (i) for inhibiting the drive in the same direction (macro position direction) as the just-before drive direction stored previously. In step RTI, it returns to step "variable power focus" of the subroutine of FIG. 11 and thereafter step END, thereby completing the operations. Accordingly, even when up-switch 17a is operated again in this state, inhibiting section 20 inhibits state signal (j) outputted from switch judging section 18 and indicating the drive in the direction for increasing the magnification, i.e., the drive in the macro position direction so that no state signal is outputted from inhibiting section 20 to variable power control section 21. Accordingly, the variable power optical system is not moved from the tele-position to the macro region.

Next, a description is given with respect to the case in which the judgement in the above condition step "variable power region?" in FIG. 12 is NO. This case is a case in which the overrunning operation is performed with respect to the variable power optical system. Accordingly, variable power optical system 2 is located within the macro region slightly from position $P_{10}$ at the other end of the telepositions. First, in the condition step "Is signal (c) at low level?", housing region signal (c) is judged in voltage level and this judgment is NO since this signal is at the high level in voltage. In the next step "drive in housing direction", stop/reverse judging section 14 outputs reverse signal (g) and variable power control section 21 receives this signal and reversly rotates variable power motor Mz. In the next step "variable power region?", when the judgment is NO repeatedly and variable power optical system 2 passes position $P_{10}$ and is moved into positions $P_8$ to $P_{10}$ as a boundary region during this judging operation, the judgment in step "variable power region?" is YES and it returns to the above braking operation again and the above-mentioned operations are similarly performed.

In this state, i.e., when variable power optical system 2 is located within positions $P_8$ to $P_{10}$ and down-switch 17b is then operated, variable power optical system 2 is moved from the tele-position onto the side of the wide position and is continuously driven while down-switch 17b is continuously closed. When variable power optical system 2 is moved into wide positions $P_3$ to $P_5$, the subroutine ZMB by the interrupting processing of FIG. 12 is started, similar to the above description, and the above-mentioned operations are similarly performed. Thus, variable power optical system 2 is inhibited from being moved again in the housing position direction by step "inhibit in housing direction" for stopping the operation of zoom optical system 2 within wide positions $P_3$ to $P_5$. This inhibiting state and the inhibiting state in the above macro direction are released when housing switch 15 or Z/M change-over switch 16 is operated.

As mentioned above, in accordance with the present invention, first pattern 5a having Zp pattern 22, second pattern 5b and third pattern 5c composed of a conductor and an insulator are disposed on the same substrate 32. Brush 6 slidably contacts first pattern 5a, second pattern 5b and third pattern 5c thereon, and three constant positions thereof are detected by general discriminating section 8 and the position between positions $P_5$ and $P_6$ is continuously detected by focal distance detecting section 7, thereby making discriminating pattern section 5 small-sized.

Further, since the constant positions are detected by second pattern 5b, third pattern 5c and ground patterns 23, 24 and the above continuous position is detected by Zp pattern 22, the accuracy in position detection in Zp pattern is high in comparison with the detection of both constant and continuous positions by only a resistor.

Further, since the apparatus can be constructed by on substrate 32 and one brush 6, the number of members for use is reduced and the construction of the apparatus is simplified and a link mechanism, etc. are not needed in comparison with a structure in which the constructions for the constant and continuous positions are separately arranged on the substrate, thereby reducing the number of adjusting portions and improving the accuracy of the apparatus.

Furthermore, as shown in FIGS. 6 and 7, the width (length in the radial direction) of electricity-collecting pattern 62 is increased by disposing junction patterns 81, 83 and lead patterns 82, 84, 83a, 85 on the rear face so that the contact area between brush 6 and electricity-collecting pattern 62 is increased and these members can be electrically stabilized. Moreover, since through hole 69 is disposed in the position of escape hole 91 of brush 6, through hole 69 does not prevent the movement of brush 6.

The present invention is not limited to the above-mentioned embodiment, but can be changed in various modifications within the scope of the features of the present invention.

For example, in the above-mentioned embodiment, the present invention is applied to the position detecting apparatus of zoom optical system 2. However, the present invention can be applied to a position detecting apparatus for detecting any one of predetermined and arbitrary positions of a generally moving body.

Further, as shown in FIGS. 4 to 7, substrates 32 and 54 are not limited to be in the shape of an arc, but can be changed in shape depending on applied objects and may be in the shape of a straight line as shown in FIG. 2.

Further, through hole 69 in FIG. 6 is not limited to be disposed in the left-hand end portion of electricity-collecting patter 62, but the position of this through hole may be changed if this through hole is located within a region through which escape hole 91 passes.

Housing region $P_0$ to $P_3$ and macro region $P_{10}$ to $P_{13}$ are not limited to be respectively connected to wide positions $P_3$ to $P_5$ and tele-positions $P_8$ to $P_{10}$ of the zoom region, but may be respectively connected to these positions reversely. The important point is that the housing region is connected onto the smaller side of a moving amount of zoom optical system 2 for housing.

The present invention constructed as above has the following effects.

A resistance section and a plurality of region discriminating pattern sections having a stripe shape are disposed on the same substrate. A brush connected to a moving body slidably contacts the resistance section and the region discriminating pattern sections thereon. When this brush is located on the above resistance section, a first position detecting means detects an arbitrary position of the moving body on a continuously moving region. When the above brush is located on the region discriminating pattern sections, a second position detecting means detects a constant position of the moving body. Accordingly, the construction of the apparatus is simplified and is easily adjusted in operation and can be made compact. Further, the accuracy in position detection, especially, the accuracy(resolution) in position detection on the continuously moving region can be greatly improved.

Further, in the position detection apparatus in the present invention, a through hole extending through the substrate is disposed in a position of a flat pattern section through which the brush does not pass. The flat pattern section and a lead section disposed on the rear side thereof are electrically connected to each other by this through hole. Accordingly, the width of the flat pattern section contacting the brush, i.e., the contact area can be greatly increased so that the position can be detected reliably and stably.

Many widely different embodiments of the present invention may be constructed without departing from the spirit and scope of the present invention. It should be understood that the present invention is not limited to the specific embodiments described in the specification, except as defined in the appended claims.

What is claimed is:

1. A potentiometer for electrically detecting a present position of a moving body movable in two directions opposite to each other within a movable region, comprising:

a resistance section disposed on a first part of one surface of an insulating body so as to extend in one direction;

a plurality of conductive sections disposed on a second part of said one surface of said insulating body so as to be apart from each other and to extend in said one direction, said second part being in the vicinity of said first part of said one surface;

a brush means provided with a conductive brush, said conductive brush being adapted to be slidable in two directions opposite to each other in response to the moving of said moving body, said brush contacting at least two of said conductive sections when said moving body is positioned in a first region of said movable region and said brush contacting said resistance section and at least one of said conductive section when said moving body is positioned in a second region of said movable region;

a first position detecting means for detecting the present position of said moving body in said second region based on a resistance value corresponding to a location of said brush when said moving body is positioned in said second region; and a second position detecting means for detecting the present position of said moving body in said first region based on the electric connection of said at least two conductive sections by said brush when said moving body is positioned in said first region.

2. A potentiometer according to claim 1, in which said resistance section comprises a resistor and each of said conductive sections comprises a conductor.

3. A potentiometer according to claim 1, in which each of said conductive sections has a stripe shape.

4. A potentiometer according to claim 1, in which said first position detecting means detects a present position of said moving body in said second region by detecting a voltage corresponding to said resistance value.

5. A potentiometer according to claim 1, in which said first position detecting means detects continuously a present position of said moving body in said second region.

6. A potentiometer according to claim 1, in which said second position detecting means detects a stop position of said moving body in said first region.

7. A potentiometer according to any one of claims 1 to 6, in which each of each said conductive sections further comprises hole means disposed in said insulating body so as to electrically connect said conductive section to a corresponding lead section disposed on another surface of said insulating body, said hole means being disposed on a predetermined portion of each said conductive section through which said brush does not pass.

8. A potentiometer according to claim 7, in which said hole means comprises a through hole.

* * * * *